US012634288B2

(12) United States Patent
Lantzman et al.

(10) Patent No.: US 12,634,288 B2
(45) Date of Patent: May 19, 2026

(54) METHOD AND SYSTEM FOR SEAMLESSLY REGISTERING ENTITLEMENTS WITHIN DIFFERENT TYPES OF ACCESS MANAGEMENT SYSTEMS

(71) Applicant: JPMorgan Chase Bank, N.A., New York, NY (US)

(72) Inventors: Eyal Lantzman, Cambridge (GB); Jaroslaw Podgajny, Bromley (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 120 days.

(21) Appl. No.: 18/524,846

(22) Filed: Nov. 30, 2023

(65) Prior Publication Data

US 2025/0184332 A1     Jun. 5, 2025

(51) Int. Cl.
    *H04L 9/40*          (2022.01)

(52) U.S. Cl.
    CPC ............ *H04L 63/102* (2013.01); *H04L 63/20* (2013.01)

(58) Field of Classification Search
    CPC .............................. H04L 63/102; H04L 63/20
    See application file for complete search history.

(56) References Cited

U.S. PATENT DOCUMENTS

| | | | | |
|---|---|---|---|---|
| 9,483,491 | B2 * | 11/2016 | Wijayaratne | .......... H04L 63/101 |
| 9,600,666 | B1 * | 3/2017 | Harter | ................. H04L 63/1433 |
| 10,511,589 | B2 * | 12/2019 | Gangawane | ............ H04L 63/10 |
| 10,528,290 | B2 * | 1/2020 | Venetsanopoulos | ......................... |
| | | | | G06F 3/0617 |
| 10,965,686 | B1 * | 3/2021 | Agarwwal | .......... H04L 63/1425 |
| 11,785,015 | B2 * | 10/2023 | Pritchard | .............. H04L 63/102 |
| 12,204,668 | B1 * | 1/2025 | Brandwine | ......... G06F 21/6218 |
| 12,210,454 | B1 * | 1/2025 | Bhat | .................... G06F 21/6218 |
| 2018/0234400 | A1 * | 8/2018 | Mononen | ................ H04L 63/06 |
| 2018/0316676 | A1 * | 11/2018 | Gilpin | .................. H04L 9/0891 |
| 2020/0007555 | A1 * | 1/2020 | Jadhav | ................ H04L 67/1097 |
| 2021/0099450 | A1 * | 4/2021 | Jain | ...................... H04L 63/0823 |
| 2023/0092849 | A1 * | 3/2023 | Warshavsky | ........ G06F 21/6218 |
| | | | | 726/28 |
| 2024/0154967 | A1 * | 5/2024 | McGuinness | ....... H04L 63/0815 |
| 2024/0256338 | A1 * | 8/2024 | Perraut | ................. G06F 9/5027 |
| 2025/0106200 | A1 * | 3/2025 | Wang | .................... H04L 63/108 |

OTHER PUBLICATIONS

Wang X, Yin Z. Research on cross-platform unified resource access control management system. In2017 6th International Conference on Computer Science and Network Technology (ICCSNT) Oct. 21, 2017 (pp. 96-101). IEEE. (Year: 2017).*

* cited by examiner

*Primary Examiner* — James R Turchen
(74) *Attorney, Agent, or Firm* — Greenblum & Bernstein, P.L.C.

(57)          ABSTRACT

A system for registering resource entitlements within different types of access management systems. The system may be configured to: interface with at least one first access management system, define a first set of entitlement details; receive a first request to grant first entitlement to at least one first principal; and utilize the first set of entitlement details to fulfill the first request by provisioning at least one first account, within the at least one first access management system, with the first entitlement. The first set of entitlement details may identify at least one first resource to which the first entitlement permits access, and the at least one first account is accessible by the at least one first principal.

17 Claims, 4 Drawing Sheets

200

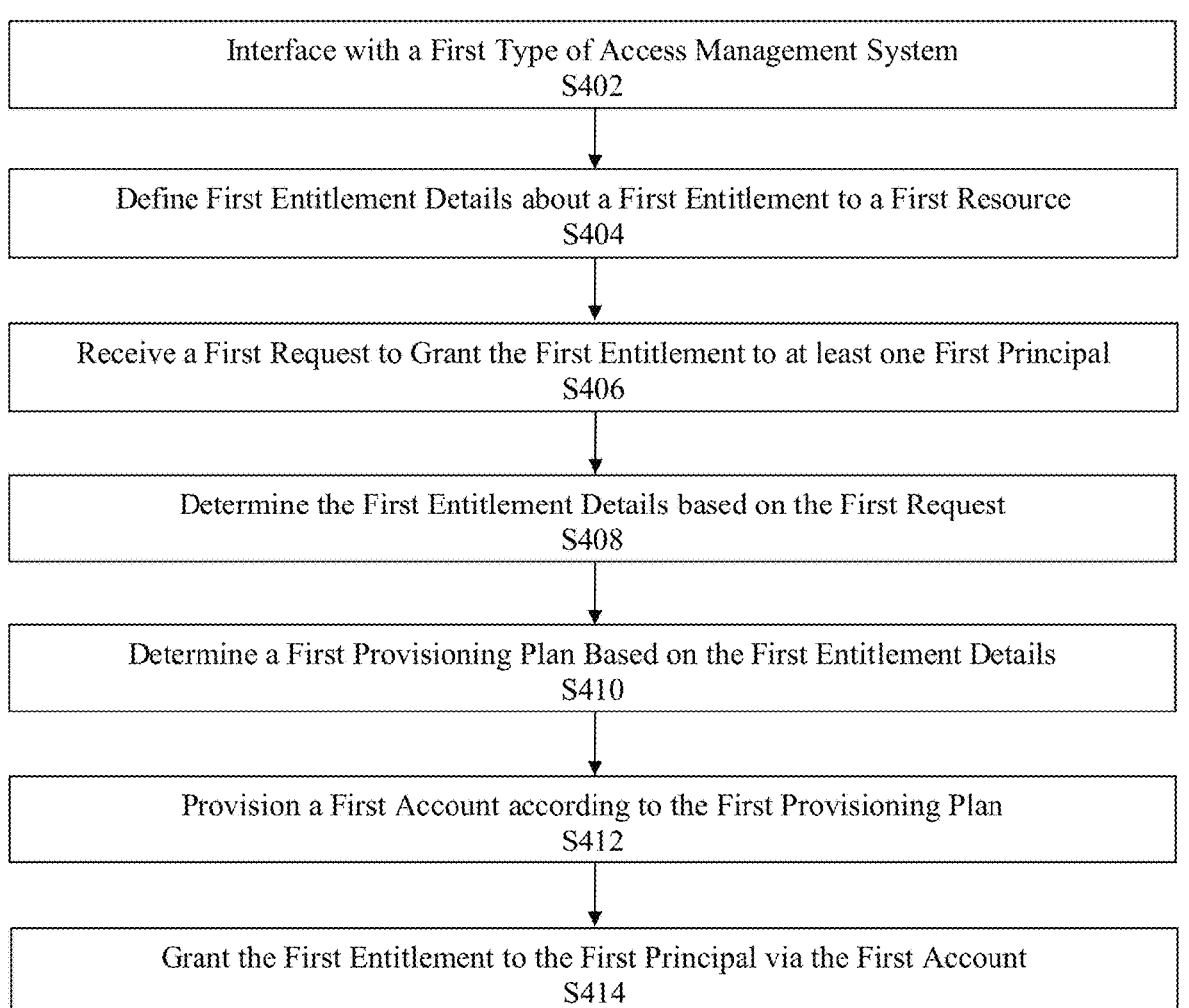

400

Interface with a First Type of Access Management System
S402

Define First Entitlement Details about a First Entitlement to a First Resource
S404

Receive a First Request to Grant the First Entitlement to at least one First Principal
S406

Determine the First Entitlement Details based on the First Request
S408

Determine a First Provisioning Plan Based on the First Entitlement Details
S410

Provision a First Account according to the First Provisioning Plan
S412

Grant the First Entitlement to the First Principal via the First Account
S414

FIG. 4

METHOD AND SYSTEM FOR SEAMLESSLY REGISTERING ENTITLEMENTS WITHIN DIFFERENT TYPES OF ACCESS MANAGEMENT SYSTEMS

BACKGROUND

1. Field of the Invention

The field of the invention disclosed herein generally relates to a resource entitlements registration platform for registering resource entitlements within different access management systems and, more particularly, to a method, system, and computer-readable storage medium for implementing technology for a resource entitlements registration platform that seamlessly registers resource entitlements within different access management systems.

2. Background of the Invention

The management of a large computer network, such as the computer network of a large enterprise, typically requires access to a variety of different resources. Conventionally, each of these computer network resources typically utilizes its own unique blend of access protocols, but their implementation tends to require the employment of individuals with highly specialized knowledge and skills in the specific area(s) of each such protocol and/or blend of protocols. Therefore, the pool of individuals with the knowledge and skills required to implement such technology tends to shrink significantly as the number of resources utilized by the subject enterprise or computer network increases, because such increases tend to cause the number of protocols—as well as the knowledge and skills required to implement such protocols—to increase as well. Unfortunately, however, the manpower that is required for these large-scale undertakings can easily exceed the available pool of individuals that have the knowledge and skills required for such undertakings.

Accordingly, there is a need in the field of the herein-disclosed invention for a technical solution to the foregoing limitation(s) in the technology of existing approaches for providing an enterprise, or large computer network, with access to resources.

SUMMARY

The present disclosure, through one or more of its various aspects, embodiments, and/or specific features or sub-component, provides, inter alia, various systems, servers, devices, methods, media, programs and platforms for implementing a universal resource entitlement registration tool that seamlessly provisions access accounts with resource entitlements within a plurality of different types of access management systems.

According to an aspect of the present disclosure, a method is provided for registering resource entitlements within different types of access management systems. The method may comprise: interfacing with at least one first access management system; defining a first set of entitlement details; receiving a first request to grant first entitlement to at least one first principal; and utilizing the first set of entitlement details to fulfill the first request by provisioning at least one first account, within the at least one first access management system, with the first entitlement. The first set of entitlement details may comprise at least one first resource identifier that identifies at least one first resource to which the first entitlement provides access, and the at least one first account may be accessible by the at least one first principal.

In the method, the at least one first principal may comprise at least one from among a first set of users, a first software environment and a first set of software agents.

In the method, the at least one first account may be provided by at least one first identity provider system, and the at least one first resource may be accessible via the at least one first access management system.

In the method, the first set of entitlement details may further comprise a first set of executable provisioning instructions that includes a first provisioning plan that provisions, with the first entitlement, access accounts that exist within a particular type of access management system.

In the method, the first provisioning plan may perform a first access account provisioning that comprises configuring the account to interface with the at least one first resource via at least one first application programming interface (API).

In the method, the first set of entitlement details may utilize JavaScript Object Notation (JSON) to identify the first set of executable provisioning instructions.

In the method, the first provisioning plan may perform the first access account provisioning according to a first set of provisioning parameters.

In the method, the first set of entitlement details may comprise the first set of provisioning parameters. The first set of provisioning parameters may map a first set of inputs of the at least one first API to a first corresponding set of inputs that comprises at least one input of the at least one first resource, and the first corresponding set of inputs may further comprise at least one input of the at least one first account.

In the method, the first set of provisioning parameters may comprise at least one first condition identifier that identifies at least one first condition under which the first entitlement provides access to the at least one first resource.

The method may further comprise defining a second set of entitlement details, receiving a second request to grant at least one second entitlement to the at least one first principal, and utilizing the second set of entitlement details to fulfill the second request by provisioning the at least one first account with the first entitlement. The second set of entitlement details may comprise at least one second resource identifier that identifies at least one second resource to which the at least one second entitlement provides access, the least one second resource identifier may have a one-to-one relationship with the at least one second resource, and the at least one first account may be accessed by the at least one first principal.

According to another aspect of the present disclosure, a computer system is provided for registering resource entitlements within different types of access management systems. The computer system may comprise a processor and memory that stores instructions that, when executed by the processor, cause the processor to perform operations. The operations may comprise: interfacing with at least one first access management system; defining a first set of entitlement details; receiving a first request to grant first entitlement to at least one first principal; and utilizing the first set of entitlement details to fulfill the first request by provisioning at least one first account, within the at least one first access management system, with the first entitlement. The first set of entitlement details may identify at least one first resource to which the first entitlement permits access, and the at least one first account is accessible by the at least one first principal.

In the computer system, the at least one first principal may comprise at least one from among a first set of users, a first software environment and a first set of software agents.

In the computer system, the at least one first account may be provided by at least one first identity provider system, and the at least one first resource may be accessed via the at least one first access management system.

In the computer system, when the instructions cause the processor to perform the operations, the first set of entitlement details may further comprise a first set of executable provisioning instructions that includes a first provisioning plan that provisions, with the first entitlement, access accounts that exists within a particular type of access management system.

In the computer system, when the instructions cause the processor to perform the operations, the first provisioning plan may perform a first access account provisioning that comprises configuring the account to interface with the at least one first resource via at least one first application programming interface (API).

In the computer system, the first set of entitlement details may utilize JavaScript Object Notation (JSON) to identify the first set of executable provisioning instructions.

In the computer system, when the instructions cause the processor to perform the operations, the first provisioning plan may perform the first access account provisioning according to a first set of provisioning parameters.

In the computer system, the first set of entitlement details may comprise the first set of provisioning parameters. The first set of provisioning parameters may map a first set of inputs of the at least one first API to a first corresponding set of inputs that comprises at least one input of the at least one first resource, and the first corresponding set of inputs may further comprise at least one input of the at least one first account.

In the computer system, the first set of provisioning parameters may comprise at least one first condition identifier that identifies at least one first condition under which the first entitlement provides access to the at least one first resource.

In the computer system, when executed by the processor, the instructions may cause the processor to perform further operations that comprise defining a second set of entitlement details, receiving a second request to grant at least one second entitlement to at least one second principal, and utilizing the second set of entitlement details to fulfill the second request by provisioning at least one second account with the at least one second entitlement. The second set of entitlement details may comprise at least one second resource identifier that identifies at least one second resource to which the at least one second entitlement provides access, the least one second resource identifier may have a one-to-one relationship with the at least one second resource, and the at least one second account is accessible by the at least one second principal.

According to yet another aspect of the present disclosure, a non-transitory computer-readable medium is provided for registering resource entitlements within different types of access management systems. The computer-readable medium may store instructions that, when executed by a processor, cause the processor to perform operations. The operations may comprise: interfacing with at least one first access management system; defining a first set of entitlement details; receiving a first request to grant first entitlement to at least one first principal; and utilizing the first set of entitlement details to fulfill the first request by provisioning at least one first account, within the at least one first access management system, with the first entitlement. The first set of entitlement details identifies the at least one first resource to which the first entitlement permits access, and the at least one first account is accessible by the at least one first principal.

In the computer-readable medium, the at least one first principal may comprise at least one from among a first set of users, a first software environment and a first set of software agents.

In the computer-readable medium, the at least one first account may be provided by at least one first identity provider system, and the at least one first resource may be accessed via the at least one first access management system.

In the computer-readable medium, when the instructions cause the processor to perform the operations, the first set of entitlement details may further comprise a first set of executable provisioning instructions that includes a first provisioning plan that provisions, with the first entitlement, access accounts that exists within a particular type of access management system.

In the computer-readable medium, when the instructions cause the processor to perform the operations, the first provisioning plan may perform a first access account provisioning that comprises configuring the account to interface with the at least one first resource via at least one first application programming interface (API).

In the computer-readable medium, the first set of entitlement details may utilize JavaScript Object Notation (JSON) to identify the first set of executable provisioning instructions.

In the computer-readable medium, when the instructions cause the processor to perform the operations, the first provisioning plan may perform the first access account provisioning according to a first set of provisioning parameters.

In the computer-readable medium, the first set of entitlement details may comprise the first set of provisioning parameters. The first set of provisioning parameters may map a first set of inputs of the at least one first API to a first corresponding set of inputs that comprises at least one input of the at least one first resource, and the first corresponding set of inputs may further comprise at least one input of the at least one first account.

In the computer-readable medium, the first set of provisioning parameters may comprise at least one first condition identifier that identifies at least one first condition under which the first entitlement provides access to the at least one first resource.

In the computer-readable medium, when executed by the processor, the instructions may cause the processor to perform further operations that comprise defining a plurality of subsequent sets of entitlement details, receiving a second request to grant at least one from among a plurality of subsequent entitlements to at least one second principal, the least one second resource identifier may have a one-to-one relationship with the at least one second resource, and utilizing the plurality of subsequent sets of entitlement details to fulfill the second request by provisioning at least one second account with the at least one from among the plurality of subsequent entitlements. The plurality of subsequent sets of entitlement details may comprise a plurality of resource identifiers that respectively identify a corresponding resource to which the plurality of subsequent entitlements respectively provide access, and the at least one second account may be accessed by the at least one second principal.

Thereby, the invention disclosed herein improves existing technology by implementing a universal resource entitlement registration tool that seamlessly provisions access accounts with resource entitlements within a plurality of different types of access management systems.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for registering resource entitlements within different types of access management systems.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
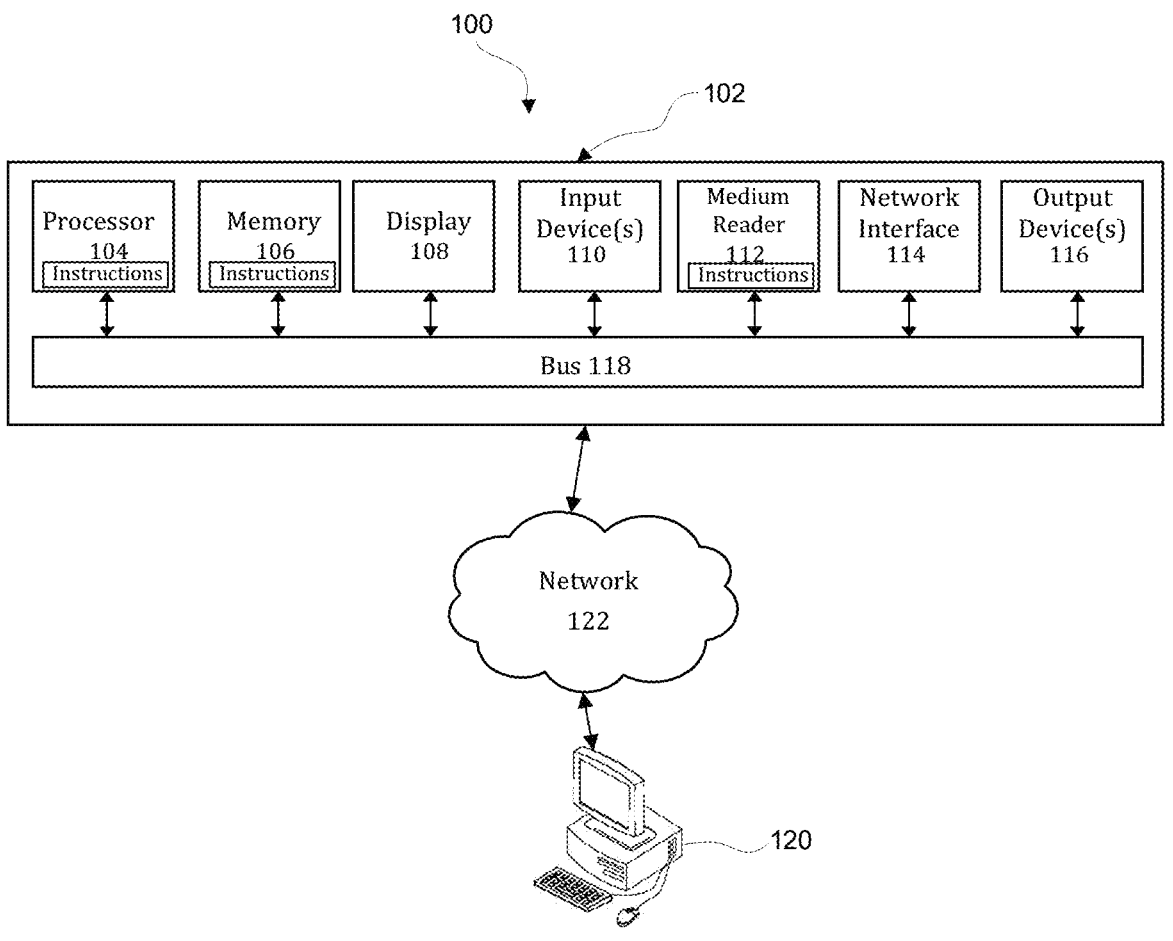
FIG. 1 is a diagram of an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for longer than a transitory period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide methods and systems for implementing a universal resource entitlement registration tool that seamlessly registers resource entitlements within different types of access management systems.

Figure 2:
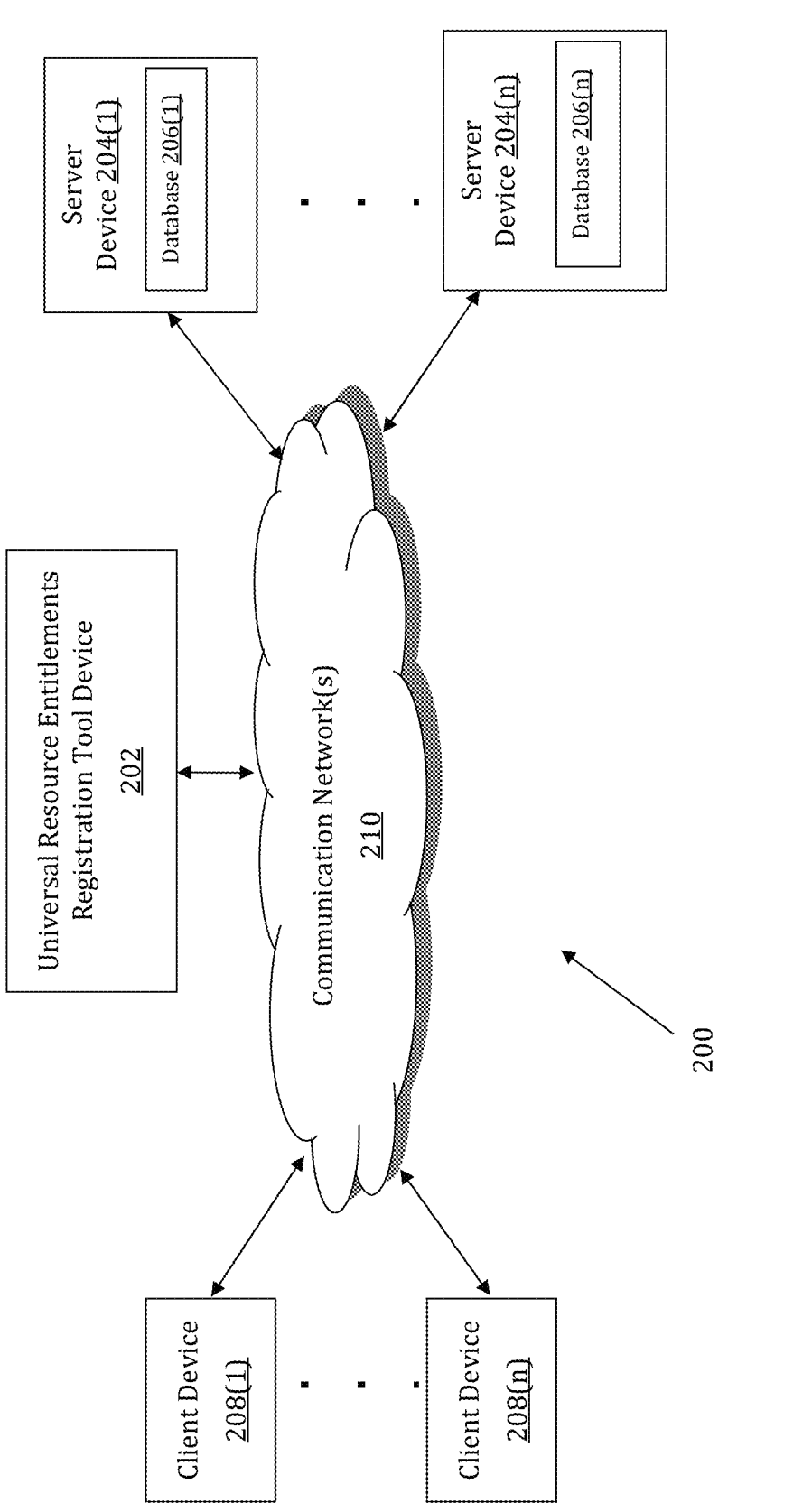
FIG. 2 is a diagram of an exemplary network environment for registering resource entitlements within different types of access management systems.

Referring to FIG. 2, a schematic of an exemplary network environment 200 an exemplary network environment that seamlessly registers resource entitlements within different types of access management systems and, thereby enables system administrators to register entitlements within a variety of different types of access managements systems without having to actually navigate through (or even understand) any of them. In an exemplary embodiment, a universal resource entitlement registration tool may be implemented on any networked computer platform, such as, for example, a personal computer (PC).

A method for registering resource entitlements within different types of access management systems may be implemented by a Universal Resource Entitlement Registration Tool (URERT) device 202. The URERT device 202 may be the same or similar to the computer system 102 as described with respect to FIG. 1. The URERT device 202 may be a rack-mounted server in a datacenter, an embedded microcontroller (MCU) in an electronic device, or another type of headless system, which is a computer system or device that is configured to operate without a monitor, keyboard and mouse. The URERT device 202 may store one or more applications that can include executable instructions that, when executed by the URERT device 202, cause the URERT device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the URERT device 202 itself, may be located in virtual server(s) running in a cloud-based computing environment rather than being tied to one or more specific physical network computing devices. Also, the application(s) may be running in one or more virtual machines (VMs) executing on the URERT device 202. Additionally, in one or more embodiments of this technology, virtual machine(s) running on the URERT device 202 may be managed or supervised by a hypervisor.

In the network environment 200 of FIG. 2, the URERT device 202 is coupled to a plurality of server devices 204(1)-204(n) that hosts a plurality of databases 206(1)-206(n), and also to a plurality of client devices 208(1)-208(n) via communication network(s) 210. A communication interface of the URERT device 202, such as the network interface 114 of the computer system 102 of FIG. 1, operatively couples and communicates between the URERT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the URERT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and URERT devices that efficiently implement a method for a Universal Resource Entitlement Registration tool that improves the overall speed, ease, and user experience of cyber defense capability assessment tasks.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The URERT device 202 may be a standalone device or integrated with one or more other devices or apparatuses, such as one or more of the server devices 204(1)-204(n), for example. In one particular example, the URERT device 202 may include or be hosted by one of the server devices 204(1)-204(n), and other arrangements are also possible. As another example, the URERT device 202 may be integrated with one or more other devices or apparatuses, such as one or more of the client devices 208(1)-208(n). Moreover, one or more of the devices of the URERT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the URERT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a variety of databases.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the URERT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the URERT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the URERT device 202, the server devices 204(1)-204(n), the databases 206(1)-206(n), the client devices 208(1)-208 (n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the URERT device 202, the server devices 204(1)-204(n), the databases 206(1)-206(n), or the client devices 208(1)-208(n), for example, may be configured to operate as virtual instances on the same physical machine. In other words, one or more of the URERT device 202, the server devices 204(1)-204(n), the databases 206(1)-206(n), or the client devices 208(1)-208(n) may operate on the same physical device rather than as separate devices communicating through communication network(s) 210. Additionally, there may be more or fewer server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
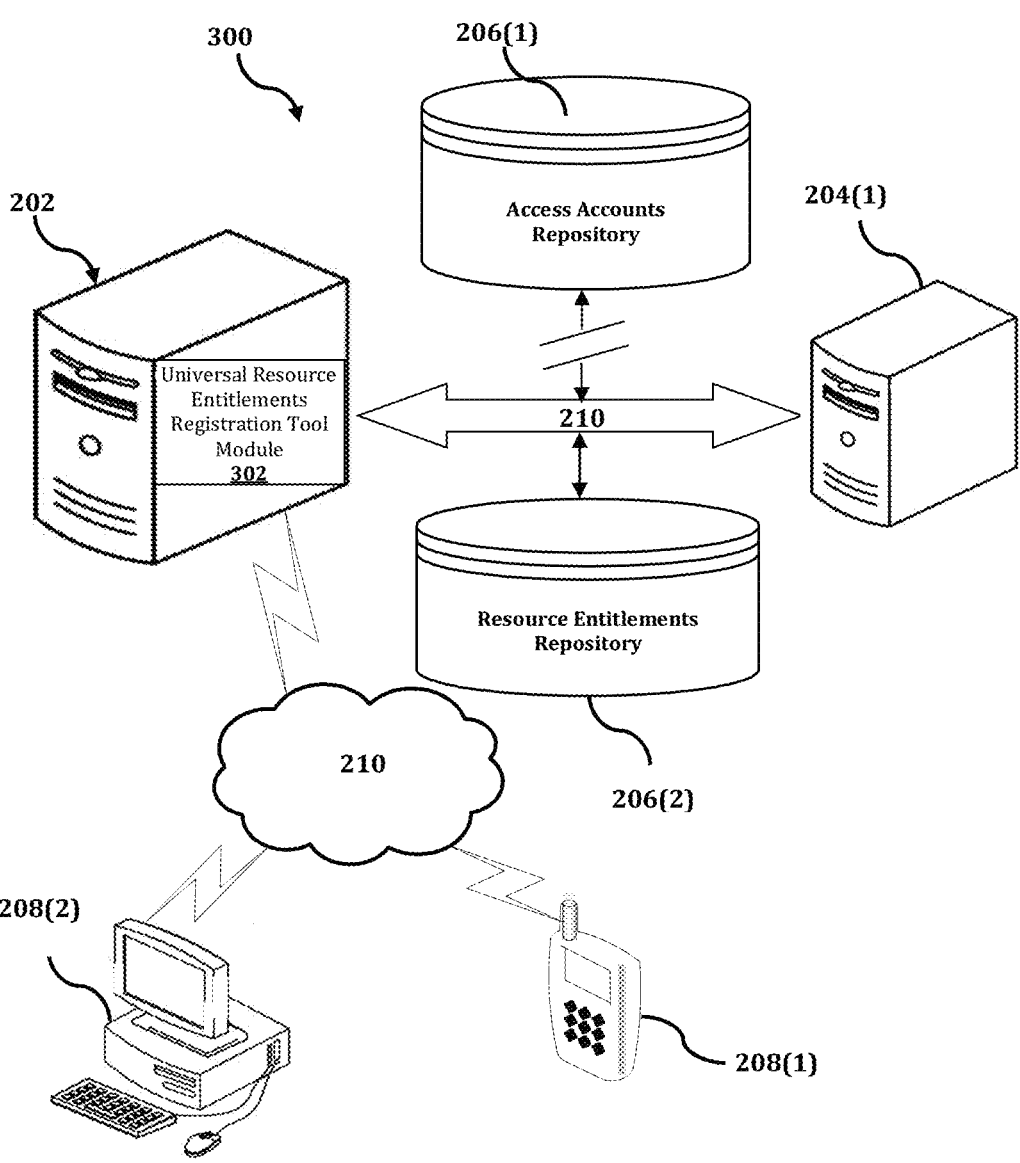
FIG. 3 is a diagram of an exemplary perspective of a network environment that registers resource entitlements within different types of access management systems.

The URERT device 202 is described and illustrated in FIG. 3 as including universal resource entitlement registration tool module 302, although it may include other rules, policies, modules, databases, or applications, for example. As will be described below, universal resource entitlement registration tool module 302 is configured to register entitlements within a variety of different types of access managements systems. Universal resource entitlement registration tool module 302 may include software that is based on a microservices architecture.

Universal resource entitlement registration tool module 302 may be integrated with one or more devices or apparatuses, such as client devices 208(1)-208(n), where universal resource entitlement registration tool module 302 may be implemented as an application or as an addon or plugin to another application of the one or more devices or apparatuses, and where universal resource entitlement registration tool module 302 may execute in the background.

An exemplary process 300 for application of a Universal Resource Entitlement Registration Tool to an aspect of the network environment of FIG. 2 is illustrated as being executed in FIG. 3. Specifically, a first client device 208(1) and a second client device 208(2) are illustrated as being in communication with URERT device 202. In this regard, the first client device 208(1) and the second client device 208(2) may be "clients" of the URERT device 202 and are described herein as such. Nevertheless, it is to be known and understood that the first client device 208(1) and/or the second client device 208(2) need not necessarily be "clients" of the URERT device 202, or any entity described in association therewith herein. Any additional or alternative relationship may exist between either or both of first client device 208(1), second client device 208(2) and URERT device 202, or no relationship may exist.

Further, URERT device 202 is illustrated as being able to access "access accounts repository" 206(1), and "resource entitlements repository" 206(2). URERT device 202 may comprise universal resource entitlement registration tool module 302, which communicates with access accounts repository 206(1). In addition, universal resource entitlement registration tool module 302 of URERT device 202 may also communicate with resource entitlements repository 206(2). Universal resource entitlement registration tool module 302 may be configured to access these databases in order to register entitlements within a variety of different types of access managements systems.

Moreover, URERT device 202 may receive and transmit data via communication network(s) 210. URERT device 202 may receive and transmit data such as code that is written in one or more of the following dialects: transaction control language (TCL), data manipulation language (D-L), data control language (DCL) and data definition language (DFL). Additionally, via communication network(s) 210, URERT device 202 may respectively receive and transmit data from and to one or more from among the following devices: server device 204, access accounts repository 206(1), resource entitlements repository 206(2) (or another database 206), first client device 208(1), the second client device 208(2), and communication network(s) 210, for example.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the URERT device 202 via broadband or cellular communication. Of course, these embodiments are merely exemplary and are not limiting or exhaustive.

Universal resource entitlement registration tool module 302 may execute a process that seamlessly registers resource entitlements within different types of access management systems and, thereby enables system administrators to register entitlements within a variety of different types of access managements systems without having to actually navigate through (or even understand) any of them. An exemplary process for a universal resource entitlement registration tool is generally indicated at flowchart 400 in FIG. 4.

In process 400 of FIG. 4, at step S402, at least one first interface is established, which enables universal resource entitlement registration tool module 302 to communicate with at least one first access management system that controls access to at least one first resource. Thereby, at step S402, universal resource entitlement registration tool module 302 is configured to communicate with the at least one first access management system to access the at least one first resource. Additionally or alternatively, universal resource entitlement registration tool module 302 comprises a first interface configuration module that may be utilized to perform step S402.

In an embodiment, the at least one first access management system may comprise at least one from among server devices 204(1)-204(n), such as server device 204(1), for example. In the embodiment, universal resource entitlement registration tool module 302 may interface with more than one type of access management system.

In an exemplary embodiment, the at least one first access management system comprises at least one first type of access management system, and the at least one first type of access management system may comprise an open standard authentication protocol, such as one or more from among OpenID and OAuth, for example. In an additional or alternative embodiment, the at least one first type of access management system may comprise a proprietary standard authentication protocol, such as a commercially available identity and access management (IAM) solution, for example.

At step S404, universal resource entitlement registration tool module 302 defines a first set of entitlement details that describe a first entitlement that provides access to the at least one first resource. The first set of entitlement details may be stored in one or more from among databases 206(1)-206(n), such as resource entitlements repository 206(2), for example.

In an embodiment, the first set of entitlement details that are defined at step S404 may comprise one or more from among at least one first resource identifier that identifies the at least one first resource to which the first entitlement provides access, at least one first condition identifier that identifies at least one first condition under which the first entitlement provides access to the at least one first resource, and a first set of executable provisioning instructions that includes a first provisioning plan that provisions access accounts with the first entitlement within a particular type of access management system. In the embodiment, the at least one first resource identifier may have a one-to-one relationship with the at least one first resource.

In an additional or alternative embodiment, the first set of entitlement details that are defined at step S404 may additionally or alternatively comprise a first set of provisioning parameters. The first set of provisioning parameters may map a first set of first API inputs to a first corresponding set of inputs. In the embodiment, the first set of first API inputs may correspond to at least one first API, and the corresponding set of inputs may comprise one or more from among: at least one first resource input of the at least one first resource; and at least one first access account input of at least one first access account.

It should be noted that although step S402 is described as preceding step S404, step S402 may additionally (or alternatively) be performed after (and/or in parallel with) step S404.

At step S406, universal resource entitlement registration tool module 302 receives a first request to grant the first entitlement to at least one first principal. In an embodiment, the first request may be received as external input from a first local user via an input device, such as input device 110, for example. Additionally (or alternatively), the first request may be received as local input from first local software module via a local processor, such as processor 104, for example. Moreover, the first request may be received as remote input from a first remote user and/or software module via a network interface, such as network interface 114, for example.

In an additional or alternative embodiment, the first request may be received as remote input from at least one from among a user, software environment, and/or software agent via at least one corresponding client device, such as client device 208(1) and/or client device 208(2), for example.

At step S408, universal resource entitlement registration tool module 302 determines the first set of entitlement details based on the first request to grant the first entitlement to at least the first principal, which may comprise at least one from among a first user, software environment, and/or software module (e.g., a first software agent). In an embodiment, the first request may comprise at least a first subset of the first set of entitlement details and, at step S408, universal resource entitlement registration tool module 302 may determine the first set of entitlement details by evaluating the first request to identify the at least first subset of the first set of entitlement details.

In an exemplary embodiment, the at least first subset of the first set of entitlement details that universal resource entitlement registration tool module 302 identifies by evaluating the first request, may comprise one or more from among a first entitlement identifier that identifies the first entitlement, at least one first resource identifier that identifies the at least one first resource, and at least one account identifier that identifies at least one first access account that can be accessed by (or that otherwise belongs to) the at least one first principal. In the exemplary embodiment, the at least one account identifier may have a one-to-one relationship with the at least one first access account.

In the exemplary embodiment, the first set of entitlement details may utilize JavaScript Object Notation (JSON) to identify a first set of executable provisioning instructions that includes a first provisioning plan. In an additional or alternative embodiment, the first set of entitlement details may comprise the first set of executable provisioning instructions, and a first set of provisioning parameters that may map a first set of inputs of the at least one first API to a first corresponding set of inputs that may comprise at least one input of the at least one first resource and at least one input of the at least one first account.

In the embodiment, the first set of entitlement details may be determined based on at least one from among the first entitlement identifier, the at least one first resource identifier, the at least one account identifier, and any combination thereof. For example, universal resource entitlement registration tool module 302 may utilize the at least one first resource identifier to determine that the at least one first access management system manages access to the at least one first resource.

In a further embodiment, the at least one first access management system may comprise at least a first namespace. An exemplary embodiment of one or more such namespace implementations is described in table 1 below.

TABLE 1

| Container Name | Scope |
|---|---|
| Namespaces | Namespace management across the different vault clusters. A namespace is globally unique. |
| Users | Management of users, and user patterns as they reflected in vault and the supporting metadata to support integration with our company's IAM. |
| Groups | Management of group, and group-entitlement patterns as they reflected in vault and the supporting metadata to support integration with our company's IAM. |
| Entitlements | Representation of a group which participates in our company's IAM, as an entitlement which could be requested. An entitlement can have provisionable IaC modules for consumers and provider automation based provisioning. Entitlements are immutable and changes managed via revisions. |
| Approved Entitlements | Representation of an approved entitlement. When provisionables can be parameterized, it would capture the parameter key-value mapping as well. Approved entitlements are immutable and changes managed via revisions. |
| Provisioned Entitlements | Representation of a cloud identity platform provisioned entitlements, which were previously approved. An entitlement can be approved once, but can provisioned many times, with auto-approval conditions set on the original entitlement. Provisioned entitlement will capture in provisioning state (inputs, outputs) where provisionable consumer/provider IaC modules have been specified. Provisioned entitlements are immutable and changes managed via revisions. |
| Hashi Vault | A HA, multi-region deployment of Hashi Vault instance. We would need several of those deployments based on cell-based architecture principals and hashi vault limits. |
| Cloud OIDC Provider | Cloud native OIDC provider, with no runtime dependencies on JPMC private cloud for authNZ. |
| Cloud Identity SCIM | The system for cross-domain identity management (SCIM) interface for inbound (only!) way to discover, map, and audit users and groups, as they reflected Cloud Identity Platform Data Flow and Transformation |
| Cloud Identity Provisioning | Automation based provisioning of approved entitlements. Integrates with Cloud Identity SCIM to ensure no external mutation of memberships (of user to groups and groups with users) except via SCIM. |
| Cloud Identity Audit | Query based discovery of all the changes in entitlement lifecycle. Feeds into our company's audit and assurance for identity and access. |

At step S410, universal resource entitlement registration tool module 302 determines the first provisioning plan based on the first entitlement details. For example, in an exemplary embodiment, the first provisioning plan may be determined based on at least one from among the first entitlement identifier, the at least one first resource identifier, the at least one account identifier, and any combination thereof. In another embodiment, the first set of entitlement details further comprises the first set of executable provisioning instructions that includes a first provisioning plan.

A provisioning plan is designed to provision desired access accounts with entitlements within a particular type of access management system environment. Accordingly, at step S410, universal resource entitlement registration tool module 302 determines to utilize the first provisioning plan to provision the first access account with the first entitlement within a particular type of access management system. In the exemplary embodiment, the first provisioning plan may be further designed to provision desired access accounts by configuring a desired access account to interface with the at least one first resource via at least one first application programming interface (API).

At step S412, universal resource entitlement registration tool module 302 determines that at least one provisioning condition (e.g., an auto-approval condition) is met and responsively provisions, with the first entitlement, the first access account that exists within a particular type of access management system. In an embodiment, universal resource entitlement registration tool module 302 may utilize the first provisioning plan to provision the first access account with the first entitlement. In another embodiment, the first access account may be created at the beginning of step S412. However, it should be noted that in alternative embodiments, rather than proceeding to step S412 as provided, universal resource entitlement registration tool module 302 may instead determine that the at least one provisioning condition is not met and responsively reject the first request.

At step S414, universal resource entitlement registration tool module 302 grants the first entitlement to the first principal via the first account. To be specific, once the first access account has been provisioned with the first entitlement within the first type of access management system, universal resource entitlement registration tool module 302 then grants the first entitlement to the first principal at step S414. Subsequently, the first principal will be entitled to access the first resource via the first access management system. In an embodiment, after universal resource entitlement registration tool module 302 performs step S414, the first principal will be entitled to access the first resource.

After step S414, process 400 may return to step S402 in order for universal resource entitlement registration tool module 302 to perform process 400 for a second entitlement. In an additional or alternative embodiment, process 400 may end (or terminate) after step S414. In a further embodiment, after step S414, process 400 may return to step S402 either indefinitely or may return to step S402 until a predetermined time or a predetermined amount of entitlements have been granted.

In addition to the foregoing, universal resource entitlement registration tool module 302 may display a user interface, such as a graphical user interface (GUI), via a display of a computer system, such as display 108 of computer system 102. Universal resource entitlement registration tool module 302 may illustrate or otherwise indicate and/or depict its activities and/or operations via the user interface. Thereby, users may view such activities and/or operations of universal resource entitlement registration tool module 302 from the user interface.

In an embodiment, the user interface may additionally or alternatively be utilized by users to obtain and view a list of: one or more desired access accounts, one or more entitlements, one or more access management systems, one or more resources, or any combination thereof. In the embodiment, the users may further utilize the user interface to obtain and view the association(s) and/or correspondence(s) between any combination of the one or more desired access accounts, the one or more entitlements, the one or more access management systems, and the one or more resources.

An exemplary embodiment of an exemplary namespace API is described in table 2 below.

TABLE 2

| Namespace APIs |
| --- |
| 1. POST/v1/identity/namespace<br>Creates a new namespace and vault instance association,<br>with an optional default external group, |

TABLE 2-continued

| Namespace APIs |
| --- |
| The external group would be bound to<br>Cloud Identity Users associated with that group e.g. LDAP.<br>Authorized Roles: NamespaceViewr, NamespaceAdmin<br>2. GET/v1/identity/namespace<br>List all the namespaces configured<br>Authorized Roles: NamespaceViewer, NamespaceAdmin<br>3. GET/v1/identity/namespace/{namespace}<br>Describe a namespace, and the default external Cloud Identity Group<br>Authorized Roles: NamespaceViewer, NamespaceAdmin<br>4. DELETE/v1/identity/namespace/{namespace}<br>Archives all the namespace artifacts (exc for secrets), and delete<br>the namespace<br>Authorized Roles: NamespaceAdmin<br>5. /v1/identity/namespace/{namespace}/policy<br>Pass through APIs to Vault Policy Management<br>https://www.vaultproject.io/docs/concepts/policies |

An exemplary embodiment of an exemplary user API is described in table 3 below.

TABLE 3

| User APIs |
| --- |
| 1. POST/v1/identity/{namespace}/user<br>Creates a generic Vault Entity. Pass all payload to/identity/entity API.<br>Authorized Roles: ResourceAdmin<br>2. POST/v1/identity/{namespace}/user/ourcompany-identity/v1<br>Run our company's Identity provisioning flow. See logical domains manager (LDM) for<br>payload.<br>Authorized Roles: NamespaceViewer, NamespaceAdmin<br>3. POST/v1/identity/{namespace}/user/serviceprovider-agent-of-ourcompany-identity/v1<br>Run the cloud service provider agent of our company's provisioning flow. See LDM for<br>payload.<br>Authorized Roles: ResourceAdmin<br>4. POST/v1/identity/{namespace}/user/resource-group-identity/v1<br>Run the Resource Group Identity provisioning flow. See LDM for payload.<br>Authorized Roles: ResourceAdmin<br>5. GET/v1/identity/namespace/{namespace}/user<br>List all the active-mapped Cloud Identity Users in a namespace<br>Authorized Roles: Viewer, ResourceAdmin, ProvisioningAutomation<br>6. GET/v1/identity/{namespace}/user/{user-id}<br>Describe the specific Cloud Identity User id - and all the Cloud Identity Groups it's<br>associated with<br>Authorized Roles: Viewer, ResourceAdmin, ProvisioningAutomation<br>7. PATCH/v1/identity/{namespace}/user/{user-id}<br>Update user metadata<br>Payload:<br>* Metadata<br>Authorized Roles: ResourceAdmin<br>8. PUT/v1/identity/{namespace}/user/{user-id}<br>Update user groups<br>Payload:<br>* Cloud Identity Groups Association (string[ ])<br>Authorized Roles: ProvisioningAutomation<br>9. DELETE/v1/identity/{namespace}/user/{user-id}<br>Archive all the metadata for Cloud Identity User, and all of its Cloud Identity Aliases,<br>and delete all of them.<br>If the user (and aliases) were provisioned via patterns, run the deprovisioning flows.<br>Authorized Roles: ResourceAdmin, ProvisioningAutomation<br>10. POST/v1/identity/{namespace}/alias<br>Creates a generic Vault Alia. Pass all payload to/identity/entity-alias API.<br>Authorized Roles: ResourceAdmin<br>11. GET/v1/identity/{namespace}/alias<br>List all the active-mapped Cloud Identity Aliases of a Cloud Identity User in a<br>namespace<br>Authorized Roles: Viewer, ResourceAdmin, ProvisioningAutomation<br>12. GET/v1/identity/{namespace}/alias/{alias-id}<br>Describe the specific Cloud Identity Alias id - and its Cloud Identity User, and associated<br>Cloud Identity Groups<br>Authorized Roles: Viewer, ResourceAdmin, ProvisioningAutomation<br>13. DELETE/v1/identity/{namespace}/alias/{alias-id}<br>Archives all the metadata for Cloud Identity Alias and delete it<br>Authorized Roles: Resource Admin |

An exemplary embodiment of an exemplary group API is described in table 4 below.

TABLE 4

| Group APIs |
| --- |

1. POST/v1/identity/{namespace}/group
   Creates a generic Vault Group. Pass all payload to/identity/group API.
   Authorized Roles: ResourceAdmin
2. POST/v1/identity/{namespace}/group/serviceprovider-resource/v1
   Run the service provider's Identity provisioning pattern.
   Authorized Roles: ResourceAdmin
3. POST/v1/identity/{namespace}/group/serviceprovider-abac-scope/v1
   Run the cloud service provider-Resource-ABAC-Scope-Group provisioning pattern.
   Would create the group and entitlement objects. See LDM for payload information.
   Authorized Roles: ResourceAdmin
4. POST/v1/identity/{namespace}/group/generic-entitlement/v1
   Runs the Generic-Entitlement-Group provisioning pattern.
   Would create a group and entitlement objectd. See LDM for payload information.
   Authorized Roles: ResourceAdmin
5. GET/v1/identity/namespace/{namespace}/group
   List all the Cloud Identity Groups
   Authorized Roles: Viewer, ResourceAdmin,
6. GET/v1/identity/{namespace}/group/{group-id}
   Describe the Cloud Identity Goup
   Authorized Roles: Viewer, ResourceAdmin
7. DELETE/v1/identity/{namespace}/group/{group-id}
   Archive the metadata for Cloud Identity Group, and delete the group.
   If it was created using one of the partners, run deprovisioning of the pattern
   Authorized Roles: ResourceAdmin An exemplary embodiment of an exemplary entitlement resource API is described in table 5 below.

TABLE 5

| Entitlement Resource APIs |
| --- |

1. POST/v1/entitlement
   Register a new entitlement object, under provider-id, which would be associated with
   specific Cloud Identity Group.
   The entitlement object would include a Requestable and consumer and provider
   provisionables.
   Response: <entitlement-id, revision: 0>
   See LDM for payload (+revision which starts from 0).
   Authorized Roles: ResourceAdmin
2. GET/v1/entitlement/{entitlement-id}/revision
   List the entitlement, returning only the latest revisions.
   Authorized Roles: Viewer, ResourceAdmin, ProvisioningAutomation
3. POST/v1/entitlement/{entitlement-id}/revision
   Change the provisionable or the requestable information (only).
   Response: <entitlement-id, revision: incrementally new revision>
   Payload
   Consumer Provisionable
   Provider Provisionable
   Requestable
   Creation timestamp
   Creator
   Authorized Roles: ResourceAdmin
4. DELETE/v1/entitlement/{entitlement-id}
   Archive the entitlement and all the revisions, delete them, and propage the change to
   MyAccess, and the Cloud Identity Provisioning.
   Authorized Roles: ResourceAdmin
5. GET/v1/entitlement/{entitlement-id}
   Describe the (latest) entitlement.
   Authorized Roles: Viewer, ResourceAdmin, ProvisioningAutomation
6. GET/v1/entitlement/{entitlement-id}/revision
   List all the entitlement revisions.
   Authorized Roles: Viewer, ResourceAdmin, ProvisioningAutomation
7. GET/v1/entitlements/{entitlement-id}/revision/{revision}
   Describe the specific revision of an entitlement
   Authorized Roles: Viewer, ResourceAdmin, ProvisioningAutomation
8. GET/v1/entitlement/provider/{provider-id}
   List all entitlements for given provider
   Authorized Roles: Viewer, ResourceAdmin, ProvisioningAutomation An exemplary embodiment of an exemplary approved entitlement resource API is described in table 6 below.

TABLE 6

Approved Entitlement Resource APIs

1. POST/v1/approved-entitlements
Register a new approved entitlement between a provider-id and a consumer-id, which also links to the entitlement-id.
The approved entitlement will include the provisionable and the constraints/filters for which the provisioned is approved.
SCIM-request-ID will be used to track x-client-request-id HEADER from SCIM interface, for audit.
Response: <approved-entitlement-id, revision: 0>
See LDM for payload (+revision which starts from 0).
Authorized Roles: ProvisioningAutomation
2. POST/v1/approved-entitlement/{approved-entitlement-id}/revision
Change the entitlement revision, consumer provisionable and the provider provisionable (only).
Response: <approved-entitlement-id, revision: incrementally new revision>
Payload
Entitlement Revision
Consumer Provisionable: Input values or constraints approved for
Provider Provisionable: Input values or constraints approved for
Authorized Roles: ProvisioningAutomation
3. DELETE/v1/approved-entitlement/{approved-entitlement-id}
Update SCIM-Request-ID, archive the approved-entitlement and all the revisions, delete them, propagate the intent to Cloud Identity Provisioning.
SCIM-request-ID will be used to track x-client-request-id HEADER from SCIM interface, for audit.
Payload
SCIM-Request-Id
Authorized Roles: ResourceAdmin
4. GET/v1/approved-entitlement/{approved-entitlement-id}
Describe the (latest) approved-entitlement for an entitlement
Authorized Roles: Viewer, ResourceAdmin, ProvisioninigAutomation
5. GET/v1/approved-entitlement/{approved-entitlement-id}
List all the revisions for an approved-entitlement
Authorized Roles: Viewer, ResourceAdmin, ProvisioningAutomation
6. GET/v1/approved-entitlement/{approved-entitlement-id}/revision/{revision}
Describe the specific revision of approved-entitlement.
Authorized Roles: Viewer, ResourceAdmin, ProvisioningAutomation
7. GET/v1/approved-entitlement/{provider-id}
List all the (current revisions of) approved entitlements for a provider (Cloud Identity Group)
Authorized Roles: Viewer, ResourceAdmin, ProvisioningAutomation
8. GET/v1/approved-entitlement/consumer/{consumer-id}
List all the (current revisions of) approved entitlements for provider (Cloud Identity Group)
Authorized Roles: Viewer, ResourceAdmin, ProvisioningAutomation An exemplary embodiment of an exemplary provisioned entitlement resource API is described in table 7 below.

TABLE 7

Provisioned Entitlement Resource APIs

1. POST/v1/provisioned-entitlement
Register a new provisioned entitlement between a provider-id and a consumer-id, which also links to the approved-entitlement-id.
The provisioned entitlement will include the provisionable and the constraints/filters which the provisioned entitlement resource is approved for, and the resources to which the active has been applied.
SCIM-request-ID will be used to track x-client-request-id HEADER from SCIM interface, for audit.
Response: <approved-entitlement-id, revision: 0>
See LDM for payload (+revision which starts from 0).
Authorized Roles: ProvisioningAutomation
2. POST/v1/provisioned-entitlement/{provisioned-entitlement-id}/revision
Change the approved entitlement revision, consumer/provider actual resources e.g. ARNs.
Response: <provisioned-entitlement-id, incrementally new revision>
Payload
Approved entitlement revision
Provisioned into Consumer Resources
Provisioned into Provider Resources
Authorized Roles: ProvisioningAutomation TABLE 7-continued

| Provisioned Entitlement Resource APIs |
|---|
| 3. DELETE/v1/approved-entitlement/{provisioned-entitlement-id}<br>   Update provisioned entitlement with deprovisioning request id and SCIM-request-id,<br>   archive the provisioned entitlement and all the revisions and delete it.<br>   SCIM-request-ID will be used to track x-client-request-id HEADER from SCIM<br>   interface, for audit.<br>   Payload<br>   Request Id (deprovisioning request id associated with the deprovisioning)<br>   SCIM-Request-Id<br>   Authorized Roles: ProvisioningAutomation<br>4. GET/v1/provisioned-entitlement/{provisioned-entitlement-id}<br>   Describe the (latest) provisioned entitlement<br>   Authorized Roles: Viewer, ResourceAdmin, ProvisioninigAutomation<br>5. GET/v1/provisioned-entitlement/{provisioned-entitlement-id}/revision<br>   List all the revisions for a provisioned-entitlement<br>   Authorized Roles: Viewer, ResourceAdmin, ProvisioningAutomation<br>6. GET/v1/provisioned-entitlement/{provisioned-entitlement-id}/revision/{revision}<br>   Describe the revision of a provisioned-entitlement.<br>   Authorized Roles: Viewer, ResourceAdmin, ProvisioningAutomation<br>7. GET/v1/provisioned-entitlement/provider/{provider-id}<br>   List all the (current revisions of) provisioned entitlements for a provider (Cloud Identity<br>   User or Cloud Identity Alias)<br>   Authorized Roles: Viewer, ResourceAdmin, ProvisioningAutomation<br>8. GET/v1/provisioned-entitlement/consumer/{consumer-id}<br>   List all the (current revisions of) approved entitlements for a consumer (Cloud Identity<br>   User or Cloud Identity Alias)<br>   Authorized Roles: Viewer, ResourceAdmin, ProvisioningAutomation |

It should be noted that the various APIs described above are merely exemplary and are non-exhaustive.

An exemplary list of key implementation principals is provided in table 8 below.

TABLE 8

| Key implementation principals: |
|---|
| 1. When the inbound call comes from our company<br>   a. IDA provides an auth token e.g. T1, representing the identity of the JPMC user (SID/FID)<br>   b. Cloud Identity Platform will verify the token and will map it to the entitlements of an<br>entity<br>   c. Cloud Identity Platform will vend a new token with the entitlements of the cloud identity<br>(SID/FID) an the OIDC role<br>   d. The cloud service which will be using Cloud OIDC provider will using the new token for<br>authorization.<br>2. When the inbound call comes from the cloud<br>   a. The cloud workload will authenticate as cloud identity with vault<br>   b. The cloud workload will then generate a JWT with the OIDC client key<br>   c. The cloud workload will use the token as a bearer token when calling cloud services. |

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for registering resource entitlements within different types of access management systems, the method comprising:

interfacing with at least one first access management system;

defining a first set of entitlement details, wherein the first set of entitlement details comprises at least one first resource identifier that identifies at least one first resource to which a first entitlement provides access, wherein the at least one first resource identifier and the at least one first resource have a one-to-one relation;

receiving a first request to grant the first entitlement to at least one first principal;

utilizing the first set of entitlement details to fulfill the first request by provisioning at least one first account, within the at least one first access management system, with the first entitlement, wherein the at least one first account is accessible by the at least one first principal, and wherein the first set of entitlement details further comprises a first set of executable provisioning instructions that includes a first provisioning plan that provisions, with the first entitlement, access accounts that exist within a particular type of access management system;

defining a second set of entitlement details, wherein the second set of entitlement details comprises at least one second resource identifier that identifies at least one second resource to which at least one second entitlement provides access;

receiving a second request to grant the at least one second entitlement to at least one second principal;

utilizing the second set of entitlement details to fulfill the second request by provisioning at least one second account with the at least one second entitlement, wherein the at least one second account is accessible by the at least one second principal; and providing, via a user interface, a list of access management systems that comprises the at least one first access management system and at least one second access management system, wherein the at least one second resource is accessible via the at least one second access management system.

2. The method of claim 1, wherein the at least one first principal comprises at least one from among a first set of users, a first software environment and a first set of software agents.

3. The method of claim 1, wherein the at least one first account is provided by at least one first identity provider system, and wherein the at least one first resource is accessible via the at least one first access management system.

4. The method of claim 1, wherein the first provisioning plan performs a first access account provisioning that comprises configuring the account to interface with the at least one first resource via at least one first application programming interface (API).

5. The method of claim 4, wherein the first set of entitlement details utilizes JavaScript Object Notation (JSON) to identify the first set of executable provisioning instructions.

6. The method of claim 4, wherein the first provisioning plan performs the first access account provisioning according to a first set of provisioning parameters.

7. The method of claim 6, wherein the first set of entitlement details comprises the first set of provisioning parameters, wherein the first set of provisioning parameters maps a first set of inputs of the at least one first API to a first corresponding set of inputs that comprises at least one input of the at least one first resource, and wherein the first corresponding set of inputs further comprises at least one input of the at least one first account.

8. The method of claim 6, wherein the first set of provisioning parameters comprises at least one first condition identifier that identifies at least one first condition under which the first entitlement provides access to the at least one first resource.

9. The method of claim 1, further comprising:

receiving a second request to grant the at least one second entitlement to the at least one first principal; and utilizing the second set of entitlement details to fulfill the second request by provisioning the at least one first account with the at least one second entitlement, wherein the at least one first account is accessible by the at least one first principal and wherein the least one second resource identifier has a one-to-one relationship with the at least one second resource.

10. The method of claim 1, further comprising:

determining that the first set of entitlement details includes at least one auto provisioning condition that is being met.

11. A computer system for registering resource entitlements within different types of access management systems, the computer system comprising:

a processor; and memory storing instructions that, when executed by the processor, cause the processor to perform operations comprising:

interfacing with at least one first access management system;

defining a first set of entitlement details, wherein the first set of entitlement details identifies at least one first resource to which first entitlement permits access;

receiving a first request to grant the first entitlement to at least one first principal;

utilizing the first set of entitlement details to fulfill the first request by provisioning at least one first account, within the at least one first access management system, with the first entitlement, wherein the at least one first account is accessible by the at least one first principal, and wherein the first set of entitlement details further comprises a first set of executable provisioning instructions that includes a first provisioning plan that provisions, with the first entitlement, access accounts that exist within a particular type of access management system;

defining a second set of entitlement details, wherein the second set of entitlement details comprises at least one second resource identifier that identifies at least one second resource to which at least one second entitlement provides access;

receiving a second request to grant the at least one second entitlement to at least one second principal;

utilizing the second set of entitlement details to fulfill the second request by provisioning at least one second account with the at least one second entitlement, wherein the at least one second account is accessible by the at least one second principal; and providing, via a user interface, a list of access management systems that comprises the at least one first access management system and at least one second access management system, wherein the at least one second resource is accessible via the at least one second access management system.

12. The computer system of claim 11, wherein when executed by the processor, the instructions cause the first provisioning plan to perform a first access account provisioning that comprises configuring the account to interface with the at least one first resource via at least one first application programming interface (API).

13. The computer system of claim 12, wherein when executed by the processor, the instructions cause the first provisioning plan to perform the first access account provisioning according to a first set of provisioning parameters.

14. The computer system of claim 13, wherein the first set of entitlement details comprises the first set of provisioning parameters, wherein the first set of provisioning parameters maps a first set of inputs of the at least one first API to a first corresponding set of inputs that comprises at least one input of the at least one first resource, and wherein the first corresponding set of inputs further comprises at least one input of the at least one first account.

15. A non-transitory computer-readable medium for registering resource entitlements within different types of access management systems, wherein the computer-readable medium stores instructions that, when executed by a processor, cause the processor to perform operations comprising:

interfacing with at least one first access management system;

defining a first set of entitlement details, wherein the first set of entitlement details identifies at least one first resource to which first entitlement permits access;

receiving a first request to grant the first entitlement to at least one first principal;

utilizing the first set of entitlement details to fulfill the first request by provisioning at least one first account, within the at least one first access management system, with the first entitlement, wherein the at least one first account is accessible by the at least one first principal, and wherein the first set of entitlement details further comprises a first set of executable provisioning instructions that includes a first provisioning plan that provisions, with the first entitlement, access accounts that exist within a particular type of access management system;

defining a second set of entitlement details, wherein the second set of entitlement details comprises at least one second resource identifier that identifies at least one second resource to which at least one second entitlement provides access;

receiving a second request to grant the at least one second entitlement to at least one second principal;

utilizing the second set of entitlement details to fulfill the second request by provisioning at least one second account with the at least one second entitlement, wherein the at least one second account is accessible by the at least one second principal; and providing, via a user interface, a list of access management systems that comprises the at least one first access management system and at least one second access management system, wherein the at least one second resource is accessible via the at least one second access management system.

16. The computer-readable medium of claim 15, wherein the at least one first account is provided by at least one first identity provider system, and wherein the at least one first resource is accessible via the at least one first access management system.

17. The computer-readable medium of claim 15, wherein when executed by the processor, the instructions cause the processor to perform further operations comprising:

defining a plurality of subsequent sets of entitlement details, wherein the plurality of subsequent sets of entitlement details comprise a plurality of resource identifiers that respectively identify a corresponding resource to which a plurality of subsequent entitlements respectively provide access;

receiving a second request to grant at least one from among the plurality of subsequent entitlements to at least one second principal; and utilizing the plurality of subsequent sets of entitlement details to fulfill the second request by provisioning at least one second account with the at least one from among the plurality of subsequent entitlements, wherein the at least one second account is accessible by the at least one second principal.

* * * * *